June 1, 1926.

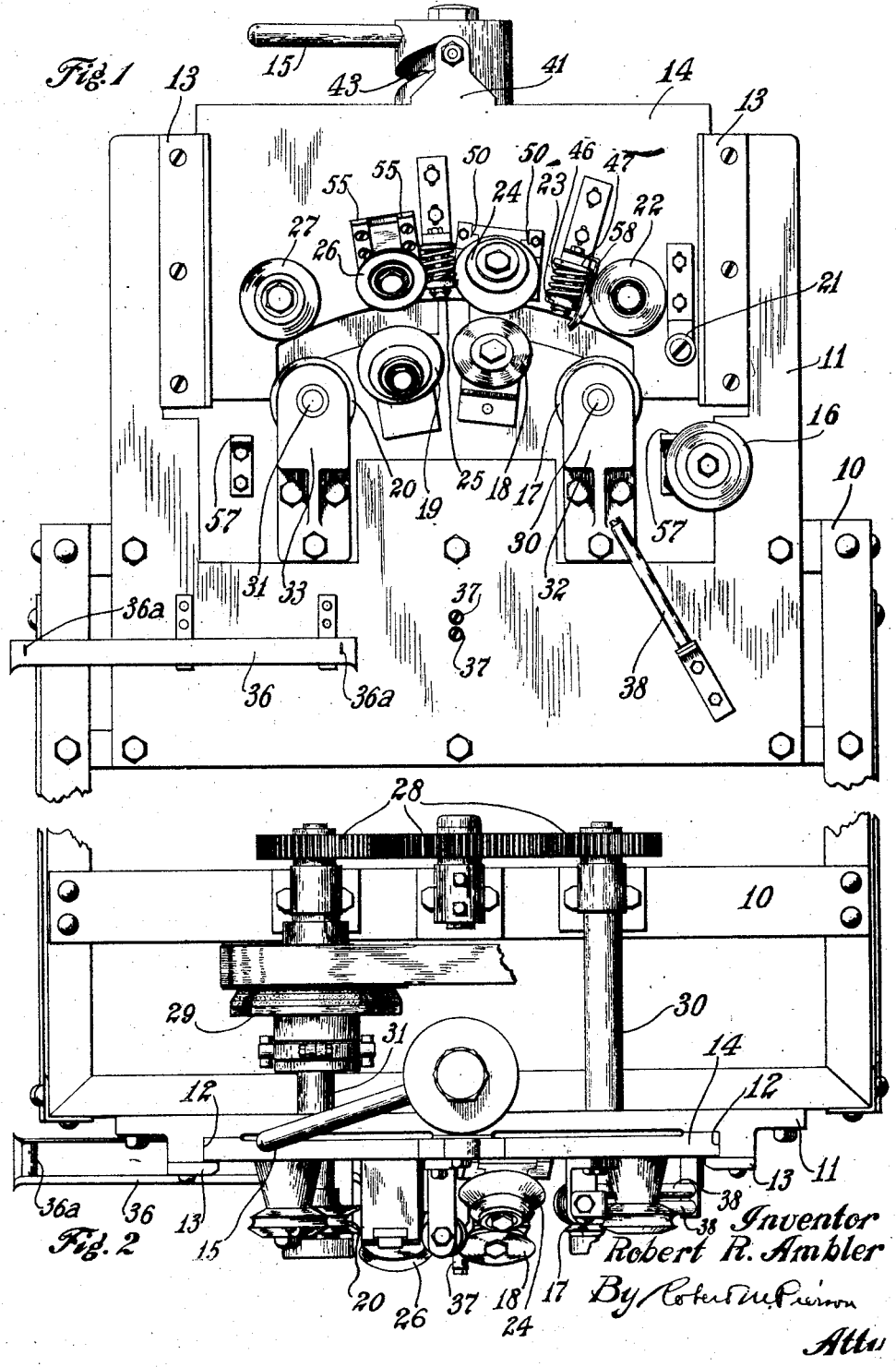

R. R. AMBLER

RING COVERING MACHINE

Filed Jan. 31, 1921

Patented June 1, 1926.

1,586,639

UNITED STATES PATENT OFFICE.

ROBERT R. AMBLER, OF AKRON, OHIO, ASSIGNOR TO THE B. F. GOODRICH COMPANY, OF NEW YORK, N. Y., A CORPORATION OF NEW YORK.

RING-COVERING MACHINE.

Application filed January 31, 1921. Serial No. 441,289.

This invention relates to the art of applying a covering to annular objects such as inextensible bead rings used to form bead-cores in the manufacture of pneumatic tires. The particular embodiment herein described and illustrated in the accompanying drawings is adapted to apply a cover formed of fabric coated with rubber to a bead ring to produce a bead-core substantially circular in cross-section. The finished article should be smooth, compact and as uniform as possible in cross-section.

Prior to my invention this work as regards rings of circular cross-section commonly was done by hand.

The object of my invention is to provide rapid, automatic means, of simple construction, for doing the work indicated, and to secure high quality and uniformity in the finished product.

A further object is to provide improved means for first progressively attaching the cover strip to the inner periphery of the ring and then folding said cover-strip toward the outer periphery of the ring, whereby undue wrinkling of said cover-strip will be obviated.

Fig. 1 is a front elevation of a preferred embodiment of my invention, in open or inoperative position.

Fig. 2 is a plan view of the same.

Fig. 3 is a front elevation showing the work in place and the parts in operative position.

Fig. 4 is a section on line 4—4 of Fig. 3.
Fig. 5 is a section on line 5—5 of Fig. 3.
Fig. 6 is a section on line 6—6 of Fig. 3.
Fig. 7 is a section on line 7—7 of Fig. 3.
Fig. 8 is a section on line 8—8 of Fig. 3.
Fig. 9 is a section on line 9—9 of Fig. 3.
Fig. 10 is a section on line 10—10 of Fig. 3.
Fig. 11 is a section on line 11—11 of Fig. 3.

Referring to the drawings:—

10 is a frame upon which is mounted a rectangular plate 11, formed with guide-ways 12, 12 and provided with removable retaining plates 13, 13 for said guide-ways. 14 is a tool-carrying plate slidably mounted in said guide-ways 12, 12. The plates 11 and 14 are preferably disposed vertically as shown for reasons which will appear hereinafter. 15 is a cam lever mounted upon a vertical axis on the top of plate 11 and adapted to raise and lower the tool-carrying plate 14 in the guide-ways 12, 12.

Mounted in the upper arc of a circle upon the front face of the stationary plate 11 is a series of rollers 16, 17, 18, 19 and 20, and upon the movable plate 14 is mounted a complemental arcuate series of rollers 21, 22, 23, 24, 25, 26, 27. 28 is a set of gears journaled upon the frame 10 and 29 is a cone clutch, said gears and clutch being adapted to drive the rollers 17 and 20 in the same direction, counter-clockwise as viewed in Figs. 1 and 3, through shafts 30 and 31 respectively, said shafts extending through the plate 11 and having their front ends journaled in brackets 32 and 33, secured to the front face of said plate, the rollers 17 and 20 being secured upon said shafts between said brackets and the plate.

34 is a cabled wire bead ring in process of being covered with a strip of rubberized fabric 35. 36 is a trough-like fabric guide provided with cylindrical weight rollers 36ª, 36ª, journaled in vertical slots in the sides of the trough. 37, 37 is a pair of loosely journaled fabric-guiding rollers mounted on axes at right angles to the face of the plate 11, and 38, 38 is a pair of loosely journaled fabric-guiding rollers mounted in alignment with the work upon axes parallel with the plate 11 and transverse to the axis of the first working roller 16.

The hub of the cam lever 15 is counter-bored at the top, as shown in Fig. 11. 39 is an axle bolt mounted in said hub and threaded into the top of the plate 11. 40 is a coil spring on said bolt within the counter-bore of said hub, said spring being interposed between the bottom of the counter-bore and the head of said bolt and adapted yieldingly to press said hub downward toward the plate 11. 41 is an ear extending upward from the middle of the top edge of the vertically slidable plate 14 and provided with a cam roller 42 associated with a cam slot 43 in the hub of lever 15, said cam roller and slot being adapted to raise or lower the plate 14 as the handle 15 is turned horizontally.

The roller, 16 of the lower series, shown in detail in Fig. 4, is loosely journaled upon the fixed plate 11 on a fixed axis at right angles thereto, and is formed with a central circumferential groove adapted to press the fabric strip 35 into arcuate cross-sectional form against the inner periphery of the ring 34. On both sides of the circumferential groove, said roller is externally threaded and provided with adjustable threaded washers, 44, 44, adapted to serve as side guides for the fabric strip 35, which may be of different widths according to the size of the bead.

The roller 21, the first of the upper series, also shown in Fig. 4 in its relation to the lower roller 16, is loosely journaled upon the vertically slidable plate 14 upon an axis at right angles and fixed relative thereto, and at a slightly more advanced position upon the work than the roller 16. It is formed with a circumferential groove adapted to fit the outer periphery of the ring 34 and to press said core against the initial roller 16 and the driven roller 17 of the lower series.

Said driven roller 17 of the lower series, shown in detail in Fig. 5, is secured upon the driven shaft 30 between the plate 11 and the bracket 32 and adjacent the latter, its axis being at right angles to the plate 11 and fixed relative thereto. Said roller is formed with a circumferential groove of greater depth than that of roller 16 and with beveled side flanges having working surfaces diverging outward from said groove, said groove and flanges respectively being adapted to press the fabric strip further around the inner periphery of the ring 34 and to bend the margins of said fabric strip upward into closer proximity to the ring. The roller 22 of the upper series, also shown in Fig. 5, is loosely journaled upon the slidable plate 14 on an axis at right angles and fixed relative thereto, and is positioned opposite the lower roller 17. Said roller 22 is formed with a circumferential groove adapted to fit the outer periphery of the ring 34 and to press said ring against the driven lower roller 17. The upper roller 22 is beveled off at each side of its groove to avoid contact with the upward-folded margins of the fabric.

The next roller, 23, shown in detail in Fig. 6, is in the upper series and is slidably journaled upon an axle secured to the plate 14, its axis being parallel with the plane of said plate and slightly back of the line of work. 46 is a compression spring interposed between said roller and a washer or hub 47, rotatably mounted upon the same axle with said roller, adjacent the bracket supporting said axle. 48, 48 are dowel pins interposed between said roller and washer, adapted to compel them to rotate together while permitting the roller to move toward and from said washer subject to the action of spring 46 upon their common axle. Said roller 23 is formed with a working surface flared from cylindrical to radial, the sectional contour of said working surface being the arc of a circle, wherefore it is adapted to fold the back fabric margin over the top of the ring section, as shown in Fig. 6, with a wiping action of the more nearly radial part of its working surface, and to press the fabric into arcuate form against the ring.

By setting the bottom of said roller's axis slightly toward the direction in which the work is moving, the wiping action of the more nearly radial part of its working surface may be applied with greater pressure in the approaching part of its orbit than in the receding part, whereby the principal wiping action will be toward the edge of the fabric margin, drawing it snugly over the ring.

The next pair of rollers, 18 and 24, are loosely journaled on axes at approximately 45° from the plane of the ring 34 and from the plates 11 and 14, as shown in detail in Fig. 7 their working surfaces downwardly diverging from said plates. The axis of the lower roller 18 is fixed relative to the plate 11 upon which it is mounted, while the upper roller 24 is loosely journaled upon a vertically slidable journal block 49, mounted in guides 50, 50. 51 is a compression spring mounted in a slot in plate 14, back of said journal block, and interposed between the top wall of said slot and the projecting foot of an angle iron 52, secured to the back of said journal block. 53 is a guide pin extending from the bottom wall of said slot slidably through a hole in the foot of said angle iron. The upper roller 24 is formed with a flared working surface in extension of the back side of a circumferential groove, said working surface with said groove being adapted to fit approximately the same part of the cover as that worked upon by the roller 23, this being the upper back section of the cover; the flared portion of said roller 24 extending downward adjacent the work. Said roller is thus adapted to press the ring downward and laterally against the lower roller 18. Said roller 18 is formed with a circumferential groove adapted compactly to roll the part of the cover opposite the groove of the roller 24 and with a beveled flange adjacent the front side of said groove adapted to turn the free edge of the fabric closer to the ring.

The next roller, 25, is loosely journaled upon a substantially vertical axis on the plate 14, its construction, mounting and mode of operation being the same as that of roller 23, as described above, except that the axis of roller 25 is in front of the work instead of behind it, wherefore it is adapted to fold over the front margin of the cover to form a lap seam with the rear fabric margin, and roll it to form, as shown in Fig. 8.

The rollers of the next pair, 19, 26, shown in detail in Fig. 9, are loosely journaled upon axes inclined to the plates 11 and 14 in a direction opposite to that in which the axes of rollers 18, 24, Fig. 7, are inclined their working surfaces downwardly approaching said plates. The axis of the lower roller 19 is fixed relative to the stationary plate 11, upon which it is mounted, and said roller is formed with a flared working surface in extension of the back side of a circumferential groove, being in form similar to roller 24, described above, but adapted to work upon the lower back section of the cover with the flared portion extending upward adjacent the work. The upper roller 26 is formed with a circumferential groove adapted to roll more compactly the section of the cover which has been worked upon by the roller 25, and is journaled upon a journal block 54, slidably mounted in guides 55, 55, for movement at right angles to the roller's axis, which is to say, at a downwardly converging angle to the plate 11. 56 is a compression spring adapted yieldingly to hold the roller 26 against the work.

The next and final pair of rollers, 20, 27, shown in detail in Fig. 10, are journaled upon parallel axes at right angles to the plates 11 and 14, and are formed with circumferential grooves adapted to fit the inner and outer peripheries respectively of the covered ring, with the lapped seam of the cover lying within the groove of the upper roller 27. The lower roller 20, as heretofore stated, is secured to the driving shaft 31, while the upper roller 27 is loosely journaled.

57, 57 are angle irons secured to the face of the fixed plate 11 and adapted to serve as stops to prevent the plate 14 from descending, when the machine is empty, so far as to bring the rollers of the two series into contact with each other and thus possibly cause their defacement. 58 is a shield secured to the mounting of the roller 23 and adapted to hold the free margin of the cover-strip away from the roller 23 as it passes thereby.

In the operation of the machine, the cam lever 15 is turned to the left, as viewed in Fig. 1, by which the plate 14 and the series of rollers mounted thereon, are raised to the position there shown. A bead ring, preferably covered with tacky rubber cement, is then placed in position, as shown in Fig. 3, with its upper arc lying between the lower and upper series of rollers. The cam lever is then turned to the right, as viewed in Fig. 3, to the position there shown, causing the upper series of rollers to close down upon the bead-core or ring 34.

A cover-strip 35 of rubberized fabric being threaded, as shown in Fig. 3, through the trough-like guide 36, under the floating rollers 36ª, 36ª, and between the guide rollers 37, 37 and 38, 38, is started by hand upon the inner periphery of the tacky cement covered ring 34 a little anterior to the roller 16. A cover-strip coated with unvulcanized rubber on one side only is preferably used, the coated side being applied, approximately at its middle line, to the ring. The guide rollers 38, having their axes parallel to the plane of the work, have advantages over side guides in that they contact the flat sides instead of the edges of the flexible strip and are thus better adapted to effect the substantial realignment of the fabric strip necessary to bring it in line with the ring. They also permit the fabric strip to be turned over, as shown, so that the coated side thereof, which is preferably kept uppermost on the table from which the fabric strip is drawn, may be presented to the ring.

Power is then applied through the clutch 29, gears 28, and shafts 30, 31, rotating the drive rollers 17, 20 in the same direction, counter-clockwise as viewed in Fig. 3, whereby the ring 34 is rotated circumferentially through the series of rollers, drawing the cover-strip with it, and the cover-strip is automatically wrapped about the ring, its margins forming a lapped seam on the outer periphery of the latter, and rolled to a smooth, regular cross-sectional shape. When the core has made approximately a complete revolution, the machine is stopped. The cover-strip is severed at the proper point to afford a suitable junction of the two ends of the strip upon the ring. The ring is then further rotated to carry the rolling operation past said junction. The machine is then opened by means of the cam lever 15, the finished product removed, and the operation repeated.

In the covering operation the upper rollers 22, 27, firmly press the work directly against the lower driving rollers 17, 20, respectively, under action of spring 40 in the hub of the cam lever 15. Upper roller 21 bears upon the work between lower rollers 16 and 17, the resiliency of the ring 34, which may be slightly straightened by the roller 21, serving to keep the pressure of the latter and of the core against the rollers 16 and 17 fairly constant. Variations in the cross-sectional size of the core are compensated with relation to the driving rollers 17, 20 by the yielding of spring 40, while such variations and any slight variations in the true circular form of the ring are compensated with relation to the intermediate lower working rolls by the springs with which upper rollers 23, 24, 25, 26 are individually provided.

I find that with this embodiment of my invention, the beads may be very rapidly covered and that the finished product is very compact, uniform and smooth surfaced.

An advantage in applying the cover from the inner periphery is that after the cover along its middle line has been attached to the ring the subsequent outward folding of the fabric stretches the latter circumferentially, thus assisting to prevent wrinkles, whereas a cover-strip first attached along its middle line to the outer periphery and then folded inwardly would tend to pucker at the margins owing to the relatively shorter length of the inner periphery.

The plates 11 and 14, and consequently the ring, being disposed vertically, the pendular weight of the ring helps to keep it in proper alignment and renders unnecessary special guides or supports for that purpose.

Details of construction may be varied without departing from my invention, and I do not limit my claims to the specific construction shown.

I claim:—

1. In a machine for producing bead-cores of circular cross-section for pneumatic tires, the combination of means for progressively applying a covering strip longitudinally to the inner periphery of an inextensible ring, a set of rollers adapted progressively, and by successive steps laterally of the work, to fold one margin of the covering strip over the crown of the ring and press it against said ring, another set of rollers adapted so to fold and press the other margin over the crown, and a drive roller adapted to propel the work past said sets of rollers.

2. A machine for covering rings comprising means for applying a cover-strip along its middle portion to the inner periphery of a ring and means for folding and pressing said cover-strip outwardly about said ring and joining the margins of said cover-strip in a longitudinal seam, the last said means comprising two opposed, arcuately arranged series of rollers.

3. A machine for covering rings, said machine comprising a set of rollers adapted freely to receive and pendularly support a ring by contact with its inner periphery, means for driving one of said rollers, means for guiding a covering strip longitudinally between said rollers and said ring, and a set of vertically movable presser rollers adapted to press the work against the rollers of the first set and to co-operate therewith in folding and pressing said covering strip laterally about said ring as the latter is propelled circumferentially.

4. A machine for covering rings, said machine comprising means for supporting and circumferentially driving a ring, means for guiding a covering strip longitudinally onto said ring, an anterior set of presser rollers having rolling surfaces stepped laterally about the work and adapted to fold and press one margin of the covering strip against the ring, and a posterior set of presser rollers having rolling surfaces stepped laterally about the work and adapted to fold and press the other margin of the covering strip against the ring and overlap it upon the first margin.

5. A machine for covering rings comprising two arcuately arranged series of rollers, means for bringing said series together upon the work and means for driving one or more of said rollers.

6. A machine for covering rings comprising a fixed plate, an arcuate series of rollers mounted upon said plate, a second plate mounted in slidable relation to the first mentioned plate, an arcuate series of rollers mounted upon said second plate, means for yieldingly adjusting said plates toward and from each other, and means for driving one or more of said rollers.

7. A machine for covering rings comprising a vertical fixed plate formed with guideways, a series of rollers mounted upon the face of said plate, a second plate slidably mounted in the guideways of said first plate, a series of rollers mounted upon the face of said second plate, a lever operatively connecting said plates, and a spring adapted to impel said plates toward each other.

8. A machine for covering rings comprising a fixed mounting, a series of rollers journaled thereon and adapted to work upon the inner periphery of a ring, means for driving one or more of said rollers, a series of rollers adapted to work upon the outer periphery of said ring, a common mounting for the rollers of the last-said series, a spring operatively interposed between one or more of the rollers of the last-said series and their common mounting, and a spring operatively interposed between the mounting of the first series and the mounting of the second series.

9. A machine for covering rings comprising a fixed mounting, a series of rollers mounted thereon comprising a first roller, a roller journaled on an axis parallel with that of the first mentioned roller, a roller journaled on an axis inclined to the axis of said first and second mentioned rollers, a roller journaled on an axis inclined oppositely from that of the third mentioned roller, a roller journaled on an axis parallel with the axis of the first and second mentioned rollers, a set of rollers adapted to press the work against the aforementioned rollers, and means for driving one or more of said aforementioned rollers.

10. In a machine for covering rings, a roller formed with a circumferential groove adapted to press a longitudinal covering strip snugly about a part of the cross section of the ring, and having an adjustable guide-flange adjacent said groove.

11. In a machine for covering rings, a roller formed with a circumferential groove and cylindrical threaded portions adjacent said groove on each side thereof and threaded washers upon said threaded portions of said roller.

12. In a machine for covering rings, a roller formed with a circumferential groove and cylindrical threaded portions adjacent said groove on each side thereof, and threaded washers upon said threaded portions of said roller, in combination with a grooved pressure roller journaled on an axis parallel to that of the first said roller, but posterior thereto with relation to the work.

13. In a machine for covering rings, a roller formed with a working surface flared from cylindrical to radial form, in combination with an elongated axle for said roller, said roller being slidably journaled on said axle, a washer rotatably mounted on said axle, and a coil spring on said axle between said washer and said roller.

14. In a bead-core covering machine the combination of means for supporting and circumferentially propelling a ring, and means for progressively wrapping a cover-strip about said ring and lapping its edges in a longitudinal seam, said means including a roller formed with a substantially radial working surface adapted to wipe a margin of the cover strip laterally of the work and yielding means for urging said roller axially toward the work.

15. In a machine for applying a cover-strip longitudinally to strip material, the combination of means for longitudinally propelling the work, and means for progressively applying the cover-strip to said strip material, laterally wrapping it about the same and progressively lapping its margins in a seam, said means including a presser roller having a working face substantially perpendicular to its axis, and journaled on an axis oblique to the direction of movement of the adjacent part of the work, so that said roller is adapted to wipe the margin of the cover-strip toward the latter's edge and not to wipe it to a substantial degree in the opposite direction.

16. In a machine for covering rings a pair of rollers, each formed with a circumferential groove and with a circumferential flange at one side only of said groove, said rollers being journaled adjacent to each other on parallel axes with said grooves in alignment and the flanged sides of the rollers disposed oppositely, and yielding means for pressing one of said rollers toward the other.

17. In a machine for applying a cover-strip to strip material, the combination of two coacting sets of rollers adapted to propel the work longitudinally and progressively fold said cover-strip laterally about said strip material, a fixed mounting common to the rollers of one of said sets, a relatively movable mounting common to the rollers of the other set, and means for moving said mountings to present said sets of rollers to and retract them from each other, said sets of rollers projecting from their mountings so as freely to receive the work from a direction transverse to the work-feed when they are retracted from each other.

18. Apparatus for applying fabric strips to bead core rings, comprising cooperating idle roller means for supporting and applying a fabric strip to the inner face of a ring and folding it radially thereabout, said roller means being arranged on the arc of a circle corresponding to the bead ring, and means for engaging a bead ring and drawing it continuously through said idle roller means.

19. Apparatus for applying fabric strips to bead core rings, comprising cooperating idle roller means for supporting and applying a fabric strip to the inner face of a ring and folding it radially thereabout, said roller means being arranged on the arc of a circle corresponding to the bead ring and roller means for engaging the bead ring, fabric and margins and simultaneously pressing said margins together and drawing the bead ring and strip through said idle roller means.

20. Apparatus for applying cover strips to endless rings, said apparatus comprising an arcuately arranged series of rollers constituting substantially the only support for the ring, said rollers being adapted to apply the middle portion of the cover strip longitudinally to the ring and subsequently to fold and press its margins laterally about the ring, and means for propelling the ring and cover strip past said rollers.

21. Apparatus for applying fabric strips to bead core rings, comprising a roller having a bead ring receiving groove, means for feeding the fabric strip thereto, a movably mounted roller for progressively pressing a superposed bead ring and the underlying strip into said groove, a pair of deflecting devices for deflecting the margins of the strip radially outward, and a pair of devices for subsequently pressing said margins together.

22. Apparatus for applying covering strips to endless rings, said apparatus comprising an arcuately arranged series of rollers adapted to support a ring hung thereon, said rollers engaging the inner periphery of the work and constituting substantially the only support thereof, means adapted to give off a strip of cover material to the inner face of the ring as the latter, hanging upon said rollers, is rotated, and movably mounted roller means adapted to be brought down upon the work to press it against said rollers, the latter being adapted to fold the cover strip laterally about the ring.

In witness whereof I have hereunto set my hand this 22nd day of January 1921.

ROBERT R. AMBLER.